United States Patent
Xu et al.

(10) Patent No.: US 9,371,589 B2
(45) Date of Patent: Jun. 21, 2016

(54) SURFACE MODIFIED NANO-SCALED TITANIUM DIOXIDE, PREPARATION PROCESS THEREOF, COATING CONTAINING THE SAME, AND PHOTOELECTROCHEMICAL METHOD FOR METAL PRESERVATION USING THE COATING

(75) Inventors: Ruifen Xu, Jiangsu (CN); Lei Geng, Beijing (CN); Yilong Yu, Jiangsu (CN); Zhuoer Ma, Jiangsu (CN); Shuangying Xie, Jiangsu (CN)

(73) Assignee: JIANGSU KFCC NEW MATERIALS CO., LTD., Changzhou, Jiangsu (CN)

( * ) Notice: Subject to any disclaimer, the term of this patent is extended or adjusted under 35 U.S.C. 154(b) by 238 days.

(21) Appl. No.: 13/881,660
(22) PCT Filed: Sep. 21, 2011
(86) PCT No.: PCT/CN2011/079936
§ 371 (c)(1),
(2), (4) Date: May 17, 2013
(87) PCT Pub. No.: WO2012/055308
PCT Pub. Date: May 3, 2012

(65) Prior Publication Data
US 2013/0224477 A1 Aug. 29, 2013

(30) Foreign Application Priority Data
Oct. 25, 2010 (CN) .......................... 2010 1 0517708

(51) Int. Cl.
*B05D 7/14* (2006.01)
*B32B 5/16* (2006.01)
(Continued)

(52) U.S. Cl.
CPC ............ *C23F 11/185* (2013.01); *C09D 5/4476* (2013.01); *C09D 7/1225* (2013.01);
(Continued)

(58) Field of Classification Search
CPC .................. Y10T 428/256; C08K 9/06; C08K 2003/2241; C23F 11/185; C09D 5/4476; C09D 7/1225; C09D 7/1266; C09D 127/12; C09D 127/14; C09D 127/16; C09D 127/18; C09D 127/20
USPC .................................. 428/328, 403; 106/436
See application file for complete search history.

(56) References Cited

U.S. PATENT DOCUMENTS 5,853,809 A * 12/1998 Campbell et al. .......... 427/407.1
2004/0170822 A1* 9/2004 Rohrbaugh et al. .......... 428/323

FOREIGN PATENT DOCUMENTS

CN 1427052 7/2003
CN 1451706 10/2003
(Continued)

OTHER PUBLICATIONS

Chen, et al, Progress in the Surface Moldification Research of Nano-TiO2 Particles; Journal of Ceramics; Mar. 2002, vol. 23, No. 1; pp. 1-5.
(Continued)

*Primary Examiner* — Holly Le
(74) *Attorney, Agent, or Firm* — Ohlandt, Greeley, Ruggiero & Perle, L.L.P.

(57) ABSTRACT

A photoelectrochemical method on metal preservation is disclosed that includes applying a coating on metal surface and curing the coating. The coating includes: A) the film-forming component; and B) the surface modified nanometer titanium dioxide, which consists of nanometer titanium dioxide particle as substrate and the nonionic surfactant covered on the substrate surface. The diameter of the nanometer titanium dioxide substrate is 1-100 nm. The hydrophile-lipophile balance value of the nonionic surfactant is 1-10 and is contained of 1-20 wt % based on the weight of nanometer titanium dioxide substrate. The content of the surface modified nanometer titanium dioxide is 0.1-10 wt % based on the total weight of the coating. The photoelectrochemical method on metal preservation through this disclosure is low cost and high efficient and obviously reduce the corrosion speed.

11 Claims, 3 Drawing Sheets

(51) Int. Cl.
 *C23F 11/18* (2006.01)
 *C09D 7/12* (2006.01)
 *C09D 127/12* (2006.01)
 *C09D 175/04* (2006.01)
 *C09D 5/44* (2006.01)
 C08K 9/06 (2006.01)
 C08K 3/22 (2006.01)

(52) U.S. Cl.
 CPC ............ *C09D 7/1266* (2013.01); *C09D 127/12* (2013.01); *C09D 175/04* (2013.01); C08K 9/06 (2013.01); C08K 2003/2241 (2013.01); *Y10T 428/256* (2015.01)

(56) References Cited

FOREIGN PATENT DOCUMENTS

| | | |
|---|---|---|
| CN | 101338156 | 1/2009 |
| CN | 101440243 | 5/2009 |
| CN | 101985536 | 3/2011 |
| CN | 101985541 | 3/2011 |
| CN | 102009037 | 4/2011 |
| WO | 2009073112 | 6/2009 |

OTHER PUBLICATIONS

International Search Report Dated Dec. 12, 2011 From International Application No. PCT/CN2011/079936.

\* cited by examiner

SURFACE MODIFIED NANO-SCALED TITANIUM DIOXIDE, PREPARATION PROCESS THEREOF, COATING CONTAINING THE SAME, AND PHOTOELECTROCHEMICAL METHOD FOR METAL PRESERVATION USING THE COATING

BACKGROUND

1. Field of the Disclosure

The present disclosure relates to a photoelectrochemical method for metal preservation, more specifically, it relates to a photoelectrochemical method for metal preservation by applying a coating containing nano-scaled titanium dioxide surface modified by nonionic surfactant on the metal surface.

2. Discussion of the Background Art

Great losses in all walks of life caused by metal corrosion account for about 3-4% of the national economic output. The modern anti-corrosion technology adopted may reduce the losses caused by corrosion by about 15%, which has considerable resource values and economic values.

Among those methods for controlling metal corrosion, the electrochemical cathodic protection and anodic protection are most effective ones. Typical examples of cathodic protection and anodic protection include, for example, cathodic protection of natural gas transmission pipelines, sacrificial anodic protection of transformer substation grounding network of a power system, gas phase cathodic protection of interior wall of storage tank, cathodic protection of bridge floor concrete, cathodic protection of petrochemical facilities, cathodic protection of shipping equipment, cathodic protection of long distance petroleum pipeline, and cathodic protection of crude petroleum storage tank, etc.

Materials used for grounding networks, for example, in the transformer substation grounding network of a power system, are mainly plain carbon steels in the form of flat steel or round steel. The grounding facilities, which have long been operated in a poor underground environment, suffer unavoidable chemical and electrochemical corrosions by soil, and stray current corrosion in stray current region of the earthing network. The corrosion of grounding network is generally shown in a local corrosion morphology. After the occurrence of corrosion, carbon steel materials of the grounding network are embrittled, exfoliated, loosened, or even fractured. With increased capacity of the electric power system and complexity of the network, as well as enhanced automation level, electric power accidents induced by the degraded performance of the grounding network gradually increase, and the damages and economic losses caused thereby also increase.

With growing concerns about anti-corrosion of the grounding network of the electric power system, anti-corrosion measures are widely taken at present in order to enhance or ensure the security level of the grounding network. Enlarged cross section of an grounding block and increased corrosion allowance can reduce negative impacts on the grounding effects exerted by corrosion, but cannot solve the problem radically, particularly in areas suffering severe corrosion, resulting in unnecessary consumption of large amounts of metal materials. Copper or other corrosion-resistant nonferrous metals may be used as grounding materials, whereas they are highly cost, difficult to construct, easy to cause galvanic corrosion, and further influencing safety of other steel structures. Composite materials such as galvanized steel, are usually employed as grounding materials, but the effect thereof won't be long lasting. The technique of cathodic protection has a favorable effect and a long protection period, and is convenient in construction. The method of sacrificial anodic electrochemical protection is suitable not only for newly-built grounding network protection, but also for reforming the old grounding network so as to prolong its life.

The method of sacrificial anodic protection or the method of applied power supply cathodic protection are effective in protecting the grounding network, however, aside from continuous consumption of sacrificial anodic metal blocks or electric energy, they further require instruments, apparatuses, conductors and the like for testing the protective current. Meanwhile, any failure of the monitoring devices such as a potentiostat in the protection system may lead to protection failure, and further result in serious corrosion of the grounding network.

SUMMARY

In view of the above situations, inventors of the present application had an extensive and profound research in the field of protection metal from corrosion, in expectation of obtaining a method for metal preservation having low cost and high efficiency and notably reducing the corrosion speed. The result showed that applying a coating containing nano-scaled titanium dioxide surface modified by nonionic surfactant on a metal surface was effective in photoelectrochemically preserving the metal. The inventors just implemented the present disclosure based on the above discovery.

An object of the present disclosure is to provide a photoelectrochemical method for metal preservation.

The present disclosure provides a photoelectrochemical method for metal preservation comprising applying a coating including the following components on metal surface and curing the coating:

A) the film-forming component; and

B) the surface modified nano-scaled titanium dioxide, which consists of nano-scaled titanium dioxide particle as substrate and the nonionic surfactant covered on the nano-scaled titanium dioxide substrate surface; the particle diameter of the nano-scaled titanium dioxide substrate is 1-100 nm, preferably 1-60 nm, more preferably 1-40 nm; the hydrophile-lipophile balance value of the nonionic surfactant is 1-10, preferably 2-8, more preferably 2-5.8; and the content of the nonionic surfactant is 1-20 wt % based on the weight of nano-scaled titanium dioxide substrate, preferably 2-10 wt %, more preferably 3-8 wt %;

wherein the content of the surface modified nano-scaled titanium dioxide is 0.1-10 wt % based on the total weight of the coating, preferably 0.5-5 wt %, more preferably 0.8-3 wt %.

In the method of the present disclosure, current necessary for metal preservation is directly supplied by the coating layer containing the surface modified nano-scaled titanium dioxide under the action of light. Compared with the traditional electrochemical protection method, the method of this disclosure saves not only applied power supply and sacrificial anode, but also complicated works like installation, detection and maintenance of a series of apparatuses such as potentiostat, reference electrode, connecting circuit, etc. Meanwhile, the method of this disclosure further enables photoelectrochemical protection of a metal to notably reduce its corrosion speed, for example, the order of magnitude of the self-corrosion current of the metal electrode coated with a coating containing the surface modified nano-scaled titanium dioxide is $10^{-9}$-$10^{-8}$ A/cm$^2$, which is generally 1-2, or even 3 orders of magnitude less than the self-corrosion current of the metal electrode coated with a coating free of nano-scaled titanium dioxide.

DETAILED DESCRIPTION OF THE PREFERRED EMBODIMENT

Figure 1:
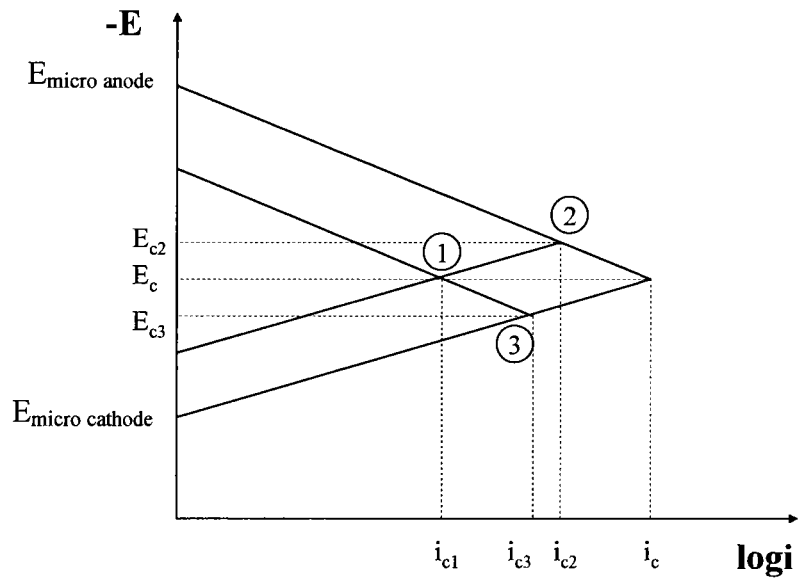
FIG. 1 is a schematic diagram of self-corrosion potential and self-corrosion current of the corroded metal before and after the photoelectrochemical protection.

The term "photoelectrochemical protection" used in the context of the present application should be so interpreted: the nano-scaled titanium dioxide in the coating layer coated on the metal surface generates electrons and holes charge carriers under the action of light, said metal absorbs the generated electrons and/or holes, so that $E_{micro\ cathode}$ of the metal corrosion cell moves negatively and/or $E_{micro\ anode}$ thereof moves positively, resulting in a reduction of the potential difference $\Delta E$ between the cathode and the anode, and further causing decrease of the self-corrosion current, so that said metal is accordingly protected, wherein the light can be ultraviolet light, visible light or infrared light.

To uniformly disperse the nano-scaled titanium dioxide particles in the coating, and to ensure their uniform dispersion in the coating layer after curing, first, inventors of the present application prepare the nano-scaled titanium dioxide surface modified by nonionic surfactant through the following steps:

a) wetting the nano-scaled titanium dioxide particle as the substrate with a wetting agent;
b) mixing the nonionic surfactant uniformly with the dispersion of nano-scaled titanium dioxide substrate in the wetting agent from step a); and
c) drying.

The used wetting agent can be any wetting agent known to a person skilled in the art. Alcohol is a preferred wetting agent used in the present disclosure. Suitable alcohols include but are not limited to methanol, ethanol, n-propanol, isopropanol, 2-methyl-1-propanol, n-butanol, 2-butanol and tert-butanol. The used wetting agent and the nano-scaled titanium dioxide substrate are in a weight ratio of 2:1-20:1, preferably 3:1-10:1.

The particle diameter of the nano-scaled titanium dioxide substrate is 1-100 nm, preferably 1-60 nm, more preferably 1-40 nm.

A suitable hydrophile-lipophile balance value of the nonionic surfactant of the present disclosure is 1-10, preferably 2-8, more preferably 2-5.8. The dosage of the nonionic surfactant is 1-20 wt % based on the weight of the nano-scaled titanium dioxide substrate, preferably 2-10 wt %, more preferably 3-8 wt %.

Drying may be operated at normal temperature or elevated temperature such as 60-80° C., and under normal pressure or reduced pressure for 10-48 hours, preferably 12-36 hours. A proper way of drying, for example, is to dry at elevated temperature such as 60-80° C. under reduced pressure.

In the method of this disclosure, the polyurethane coating containing the surface modified nano-scaled titanium dioxide is preferably applied on the metal surface for photoelectrochemical protection of the metal.

The nano-scaled titanium dioxide surface modified by the nonionic surfactant hereinabove, a polyol, an isocyanate, optional pigment and filler, as well as optional adjuvant are mixed in the solvent to obtain the polyurethane coating comprising the surface modified nano-scaled titanium dioxide, wherein the content of the surface modified nano-scaled titanium dioxide is 0.1-10 wt % based on the total weight of the coating, preferably 0.5-5 wt %, more preferably 0.8-3 wt %; the polyol and the isocyanate are in a weight ratio of 10:1-2:1, preferably 8:1-3:1, more preferably 5:1-4:1.

The polyol used can be polyester polyol, polyether polyol, epoxy resin, hydroxy acrylic resin or hydroxy alkyd resin.

The used isocyanate is toluene diisocyanate, diphenylmethane-diisocyanate, 1,6-hexamethylene diisocyanate, trimethyl hexamethylene diisocyanate, p-phenylene diisocyanate, 4,4'-dicyclohexylmethane diisocyanate, m-xylene diisocyanate, isophorone diisocyanate, 1,5-naphthalene diisocyanate or isocyanato end capped prepolymers.

In the condition that the film-forming component is polyurethane resin formed by polyols and isocyanates, it is preferred that the nonionic surfactant used during the preparation of the surface modified nano-scaled titanium dioxide is ethylene glycol aliphatic acid ester, polyoxyethylene sorbitol beeswax derivatives, diethylene glycol aliphatic acid ester or glyceryl monostearate, for example, ethylene glycol aliphatic acid ester Emcol EL-50 (HLB value of 3.6), polyoxyethylene sorbitol beeswax derivatives Arias G-1727 (HLB value of 4.0), diethylene glycol aliphatic acid ester Emcol DO-50 (HLB value of 4.7) or glyceryl monostearate Aldo 28 (HLB value of 5.5).

In the method of this disclosure, the fluorocarbon coating containing the surface modified nano-scaled titanium dioxide is also preferably applied on the metal surface for photoelectrochemical protection of the metal.

The nano-scaled titanium dioxide surface modified by the nonionic surfactant hereinabove, a fluorocarbon resin, optional pigment and filler, as well as optional adjuvant are mixed in the solvent to obtain the fluorocarbon coating comprising the surface modified nano-scaled titanium dioxide, wherein the content of the surface modified nano-scaled titanium dioxide is 0.1-10 wt % based on the total weight of the coating, preferably 0.5-5 wt %, more preferably 0.8-3 wt %.

The used fluorocarbon resin is selected from polyvinyl fluoride, polyvinylidene fluoride, vinylidene fluoride-hexafluoropropylene copolymer, tetrafluoroethylene-hexafluoropropylene-vinylidene fluoride copolymer, tetrafluoroethylene-propylene copolymer and tetrafluoroethylene-vinylidene fluoride-acrylic acid copolymer, the fluorocarbon resin is preferably selected from polyvinylidene fluoride, vinylidene fluoride-hexafluoropropylene copolymer, tetrafluoroethylene-propylene copolymer and tetrafluoroethylene-vinylidene fluoride-acrylic acid copolymer.

In the case that the film-forming component is fluorocarbon resin, the nonionic surfactant preferably used for the preparation of the surface modified nano-scaled titanium dioxide is sorbitan tristearate, ethylene glycol aliphatic acid ester, polyoxyethylene sorbitol beeswax derivatives or propylene glycol aliphatic acid ester, for example, sorbitan tristearate Span 65 (HLB value of 2.1), ethylene glycol aliphatic acid ester Emcol EO-50 (HLB value of 2.7), polyoxyethylene sorbitol beeswax derivatives Atlas G-1704 (HLB value of 3.0) or propylene glycol aliphatic acid ester Emcol PO-50 (HLB value of 3.4).

The solvents used for the coating according to the present disclosure are common solvents or a mixture thereof, including but not limited to aromatic hydrocarbons such as xylene, toluene, etc; esters such as ethyl acetate, butyl acetate, isoamyl acetate, etc; alcohols such as butanol, isobutanol, phenylcarbinol, etc; ethers such as ethylene glycol monoethyl ether, ethylene glycol monobutyl ether, propylene glycol diethyl ether, etc; ketones such as methylisobutylketone, acetophenone, isophorone, etc. A person skilled in the art may determine the amount of the solvent based on the required properties of the coating such as paintability and the like.

The filler used in the coating according to the present disclosure is, for example, talc powder, calcium carbonate, barium sulfate, silicon dioxide, etc.

The adjuvant used in the coating according to the present disclosure is for example, an anti-foaming agents, a wetting agent, a dispersant, an emulsifier, an anti-settling agent, a stabilizer, an anti-skinning agent, a leveling agent, a drier, an anti-sagging agent, a plasticizer, a delusterant, a fire retardant, a mildewproof agent, a fungicide, a trapping agent, etc.

A person skilled in the art may determine the type and the amount of the used filler and/or adjuvant based on the required properties of the coating such as bactericidal performance and the like.

In general, when a metal with a coating layer coated on its surface is immersed in an electrolyte solution, the electrolyte solution permeates through the coating layer via defects thereof and contacts the metal surface. A corrosion cell composed by micro anode and micro cathode is formed on the metal surface, thus resulting in electrochemical corrosion of the metal.

The metal with a coating layer containing nano-scaled titanium dioxide coated on its surface is subjected under the action of light, electrons of the donor level ($e^-$) are excited to the conduction band, or electrons of the valence band ($e^-$) are excited to the acceptor level, holes ($h^+$) are generated accordingly in the valence band, resulting in the production of photo-induced charge carriers, then the conductivity of the coating layer changes, and the coating layer shifts from the insulative-type to the conductive-type with a certain conductivity.

If the metal with a coating containing nano-scaled titanium dioxide coated on its surface, accepts both electrons and holes, the electrons $e^-$ enter the micro cathodic area of the metal from the nano-scaled titanium dioxide conduction band, causing the electrode potential $E_{micro\ cathode}$ of the metal micro cathode to move negatively; the holes ($h^+$) enter the micro anodic area of the metal from the nano-scaled titanium dioxide valence band, causing the electrode potential $E_{micro\ anode}$ of the metal micro anode to move positively. As $E_{micro\ anode}$ moves positively and $E_{micro\ cathode}$ moves negatively, as shown by $\hat{1}$ in FIG. 1, the potential difference $\Delta E$ between $E_{micro\ anode}$ and $E_{micro\ cathode}$ of the metal corrosion microbattery is reduced. According to the relationship $i_c = (E_{micro\ cathode} - E_{micro\ anode})/(P_a + P_k)$, assuming that the polarizability P of electrochemical reaction remains unchanged, then $i_c$ depends entirely on $\Delta E(E_{micro\ cathode} - E_{micro\ anode})$, the smaller $\Delta E$ is, the smaller the metal self-corrosion current $i_c$ is.

If a metal with a coating containing nano-scaled titanium dioxide coated on its surface, is an electron-acceptance type, the electrons $e^-$ enter the metal from the nano-scaled titanium dioxide conduction band. The micro cathode of the metal accepts the electrons, and the electrode potential $E_{micro\ cathode}$ moves negatively. Assumed that the polarizability P of electrochemical reaction remains unchanged, as shown by $\hat{2}$ in FIG. 1, the initial mixed potential $E_c$ moves negatively to $E_{c2}$, and the initial corrosion current $i_c$ reduces accordingly to $i_{c2}$.

If a metal with a coating containing nano-scaled titanium dioxide coated on its surface, is a hole-acceptance type, the holes $h^+$ enter the metal from the nano-scaled titanium dioxide valence band. The micro anode of the metal accepts the holes, and the electrode potential $E_{micro\ anode}$ moves positively. Assumed that the polarizability P of electrochemical reaction remains unchanged, as shown by $\hat{3}$ in FIG. 1, the initial mixed potential $E_c$ moves positively to $E_{c3}$, and the initial corrosion current $i_c$ reduces accordingly to $i_{c3}$.

The reduction in the self-corrosion current demonstrates that the coating containing nano-scaled titanium dioxide enables photoelectrochemical protection of the metal, and notably reduces the corrosion speed of the metal.

The electrode plate is coated with the coating containing the nano-scaled titanium dioxide surface modified by non-ionic surfactant on its surface, cured and then used as a working electrode, wherein the thickness of the cured coating layer is 15-50 μm, preferably 20-45 μm, more preferably 25-40 μm; the electrode plate can be prepared by for example, copper, steel, stainless steel or aluminium alloy. The above working electrode, a saturated calomel electrode as the reference electrode, and a Pt electrode as the auxiliary electrode together set up a three-electrode system. The three-electrode system is immersed in a 3.5 wt % NaCl electrolyte solution, followed by measuring its electrochemical polarization curve using a CA-2A potentiostat.

The advantages of the method of this disclosure are easily understood by a person skilled in art by combing the drawings of the description and taking an overall consideration of this disclosure:

(1) the nano-scaled titanium dioxide uniformly dispersed in the coating layer strengthens the physical protection of the metal by the coating layer through its nano-scaled size effect.

(2) the protective current is directly generated by the coating layer containing the surface modified nano-scaled titanium dioxide under the action of light; the applied power supply and sacrificial anode are saved;

(3) complicated works like installation, detection and maintenance of a series of apparatuses such as potentiostat, reference electrode, connecting circuit, etc., are saved; and (4) the reduction in the self-corrosion current demonstrates that the method of this disclosure enables photoelectrochemical protection of the metal, and notably reduces the corrosion speed thereof.

EXAMPLES

The present disclosure is illustrated in detail hereinbelow by reference to examples and drawings. However, the examples do not serve to restrict the scope of the present disclosure.

Example 1

2.4 g nano-scaled titanium dioxide particles having a particle diameter of 16-20 nm were precisely weighed, and added in 12.1 ml methanol under stirring. After continuous stirring for about 20 mins, 0.07 g ethylene glycol aliphatic acid ester Emol EL-50 with a hydrophile-lipophile balance value of 3.6 were added therein, and subjected to ultrasonic treatment for 20 minutes. 2.47 g surface modified nano-scaled titanium dioxide was thus obtained by drying for 24 hours at a temperature of 60° C. under reduced pressure. 1 g of said nano-scaled titanium dioxide surface modified by Emcol EL-50, 60 g hydroxy acrylic resin (TB60018P-type, Xiamen Kang Dilong Company), and 12 g toluene diisocyanate were mixed uniformly in 30.5 ml mixed solvent of butanone and xylene (in a volume ratio of 3:1) to obtain a polyurethane coating containing 1 wt % of the surface modified nano-scaled titanium dioxide. 2 g of said nano-scaled titanium dioxide surface modified by Emcol EL-50, 60 g hydroxy acrylic resin (TB60018P-type, Xiamen Kang Dilong Company), and 12 g toluene diisocyanate were mixed uniformly in 29.3 ml mixed solvent of butanone and xylene (in a volume ratio of 3:1) to obtain a polyurethane coating containing 2 wt % of the surface modified nano-scaled titanium dioxide. 60 g hydroxy acrylic resin (TB60018P-type, Xiamen Kang Dilong Company), and 12 g toluene diisocyanate were mixed uniformly in 31.6 ml mixed solvent of butanone and xylene (in a volume ratio of 3:1) to obtain a polyurethane coating free of nano-scaled titanium dioxide.

The copper electrode plate in the size of 1 cm×1 cm was welded with a copper wire. An epoxy resin and a polyamide resin were mixed in a weight ratio of 3:2, and slowly stirred uniformly using a glass rod. The uniformly mixed epoxy resin and polyamide resin were poured into a paper box in which a copper electrode plate was placed in advance, and cured for 1 day. The encapsulated copper electrode plate was rubbed in sequence by using 200#, 400#, 600# wet sand paper, wiped with alcohol, and then naturally dried in the air. The polyurethane coating free of nano-scaled titanium dioxide was coated on the treated copper electrode plate, and cured to obtain a working electrode A1. The thickness of the coating layer was measured by using a film thickness gauge as 36 μm. The polyurethane coating containing 1 wt % surface modified nano-scaled titanium dioxide was coated on another treated copper electrode plate, and cured to obtain a working electrode A2. The thickness of the coating layer was measured by using a film thickness gauge as 31 μm. The polyurethane coating containing 2 wt % surface modified nano-scaled titanium dioxide was coated on another treated copper electrode plate, and cured to obtain a working electrode A3. The thickness of the coating layer was measured by using a film thickness gauge as 25 μm.

Figure 2:
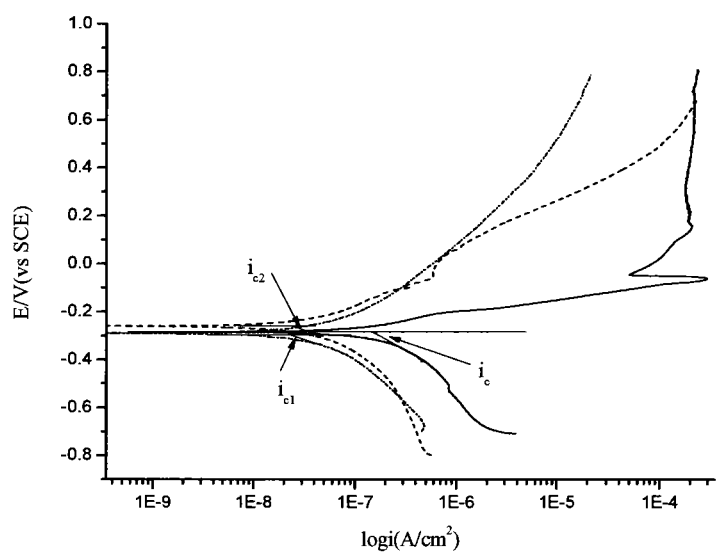
FIG. 2 shows polarization curves of the working electrode of Example 1 coated with a polyurethane coating free of nano-scaled titanium dioxide, a polyurethane coating containing 1 wt % surface modified nano-scaled titanium dioxide as well as a polyurethane coating containing 2 wt % surface modified nano-scaled titanium dioxide, which was immersed in the electrolyte solution for 1 day.

The three-electrode systems each comprising the working electrode A1, A2 or A3 were immersed in the electrolyte solution for 1 day, and then the working electrodes A1, A2 and A3 were measured according to the above mentioned method. The resulting polarization curves are shown in FIG. 2, wherein the solid curve is the polarization curve of the working electrode A1, the sparsely dotted curve is the polarization curve of the working electrode A2, and the densely dotted curve is the polarization curve of the working electrode A3. A tangent from the Tafel area intersects a straight line of the self-corrosion potential parallel to the horizontal axis to obtain an intersection, and the abscissa of the intersection represents the self-corrosion current. As shown by FIG. 2, the order of magnitude of the self-corrosion current $i_c$ corresponding to the working electrode A1 coated with the polyurethane coating free of nano-scaled titanium dioxide reaches $10^{-7}$ A/cm², the order of magnitude of the self-corrosion current $i_{c1}$ corresponding to the working electrode A2 coated with the polyurethane coating containing 1 wt % surface modified nano-scaled titanium dioxide is $10^{-8}$ A/cm², and the order of magnitude of the self-corrosion current $i_{c2}$ corresponding to the working electrode A3 coated with the polyurethane coating containing 2 wt % surface modified nano-scaled titanium dioxide is also $10^{-8}$ A/cm². The reduction in the self-corrosion current demonstrates that the polyurethane coating containing the surface modified nano-scaled titanium dioxide has a high protective effect on the copper electrode.

Example 1 is the case shown by $\hat{1}$ in FIG. 1, i.e. the copper accepts the electrons and holes charge carriers generated by exciting the nano-scaled titanium dioxide in the coating layer by light, so that $E_{micro\ cathode}$ of the metal corrosion cell moves negatively and $E_{micro\ anode}$ thereof moves positively, resulting in a reduction of the potential difference $\Delta E$ between the cathode and the anode, and further causing decrease of the self-corrosion current, as a result, the copper electrode obtains the corresponding photoelectrochemical protection.

Example 2

3.1 g nano-scaled titanium dioxide particles having a particle diameter of 45-50 nm were precisely weighed, and added in 11.8 ml ethanol under stirring. After continuous stirring for 20 minutes, 0.12 g polyoxyethylene sorbitol beeswax derivatives Arias G-1727 with a hydrophile-lipophile balance value of 4.0 were added therein, and subjected to ultrasonic treatment for 20 minutes. 3.22 g surface modified nano-scaled titanium dioxide was obtained by drying for 24 hours at a temperature of 60° C. under reduced pressure. 1 g of said nano-scaled titanium dioxide surface modified by Arias G-1727, 62 g hydroxy alkyd resin (with a number average molecular weight of 250000, Dalian Boxiang Industrial And Trade Co., Ltd.), and 7.7 g toluene diisocyanate were mixed uniformly in 33.1 ml mixed solvent of butanone and xylene (in a volume ratio of 3:1) to obtain a polyurethane coating containing 1 wt % of the surface modified nano-scaled titanium dioxide. 3 g of said nano-scaled titanium dioxide surface modified by Arias G-1727, 62 g hydroxy alkyd resin (with a number average molecular weight of 250000, Dalian Boxiang Industrial And Trade Co., Ltd.), and 7.7 g toluene diisocyanate were mixed uniformly in 30.8 ml mixed solvent of butanone and xylene (in a volume ratio of 3:1) to obtain a polyurethane coating containing 3 wt % of the surface modified nano-scaled titanium dioxide. 60 g hydroxy alkyd resin (with a number average molecular weight of 250000, Dalian Boxiang Industrial And Trade Co., Ltd.), and 7.7 g toluene diisocyanate were mixed uniformly in 34.2 ml mixed solvent of butanone and xylene (in a volume ratio of 3:1) to obtain a polyurethane coating free of nano-scaled titanium dioxide.

A difference of the treated electrode plate, which was prepared as described by Example 1, was replacing copper with A3 Steel (Beijing Anticorr Corrosion Resistance Technique Development Co., Ltd). The polyurethane coating free of nano-scaled titanium dioxide was coated on the treated A3 Steel electrode plate, and cured to obtain a working electrode B1. The thickness of the coating layer was measured by using a film thickness gauge as 38 μm. The polyurethane coating containing 1 wt % surface modified nano-scaled titanium dioxide was coated on another treated A3 Steel electrode plate, and cured to obtain a working electrode B2. The thickness of the coating layer was measured by using a film thickness gauge as 34 μm. The polyurethane coating containing 3 wt % surface modified nano-scaled titanium dioxide was coated on another treated A3 Steel electrode plate, and cured to obtain a working electrode B3. The thickness of the coating layer was measured by using a film thickness gauge as 30 μm.

Figure 3:
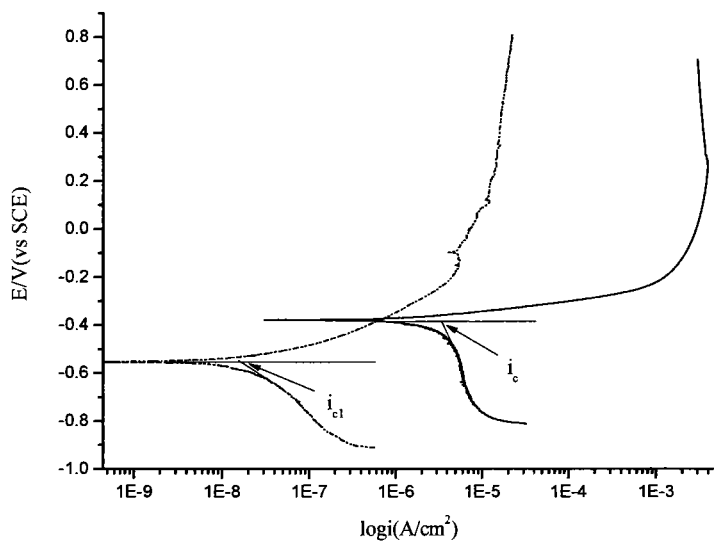
FIG. 3 shows polarization curves of the working electrode of Example 2 coated with a polyurethane coating free of nano-scaled titanium dioxide as well as a polyurethane coating containing 1 wt % surface modified nano-scaled titanium dioxide, which was immersed in the electrolyte solution for 1 hour under darkroom condition.
Figure 4:
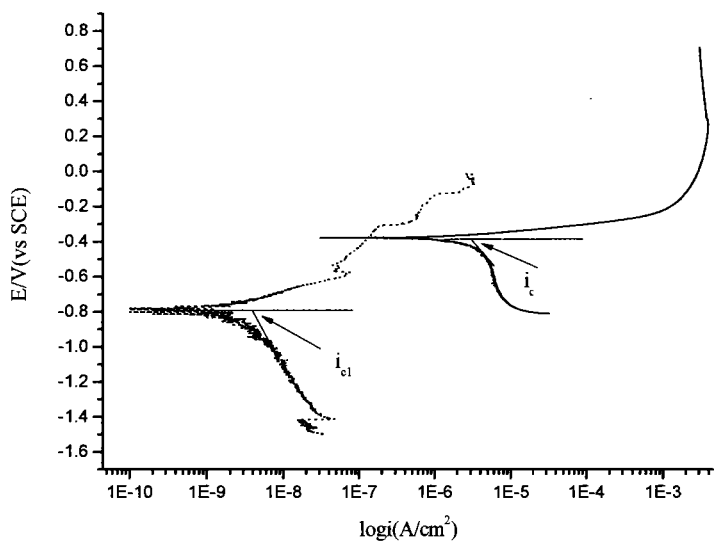
FIG. 4 shows polarization curves of the working electrode of Example 2 coated with a polyurethane coating free of nano-scaled titanium dioxide as well as a polyurethane coating containing 3 wt % surface modified nano-scaled titanium dioxide, which was immersed in the electrolyte solution for 2 hours under natural light irradiation.

The three-electrode systems each comprising the working electrode B1 or B2 were immersed in the electrolyte solution for 1 hour under darkroom conditions, and then the working electrodes B1 and B2 were measured according to the above mentioned method. The resulting polarization curves are shown in FIG. 3, wherein the solid curve is the polarization curve of the working electrode B1, and the dotted curve is the polarization curve of the working electrode B2. The three-electrode systems each comprising the working electrode B1 or B3 were immersed in the electrolyte solution for 2 hours under natural light irradiation, and then the working electrodes B1 and B3 were measured according to the above mentioned method. The resulting polarization curves are shown in FIG. 4, wherein the solid curve is the polarization curve of the working electrode B1, and the dotted curve is the polarization curve of the working electrode B3. As shown by FIG. 3, under darkroom conditions, the order of magnitude of the self-corrosion current $i_c$ corresponding to the working electrode B1 coated with the polyurethane coating free of nano-scaled titanium dioxide reaches $10^{-6}$ A/cm$^2$, and the order of magnitude of the self-corrosion current $i_{c1}$ corresponding to the working electrode B2 coated with the polyurethane coating containing 1 wt % surface modified nano-scaled titanium dioxide is $10^{-8}$ A/cm$^2$, 2 orders of magnitudes different from the former. The reduction in the self-corrosion current demonstrates that the polyurethane coating containing the surface modified nano-scaled titanium dioxide has a high protective effect on the A3 Steel electrode under darkroom conditions. As shown by FIG. 4, under natural light irradiation, the order of magnitude of the self-corrosion current $i_c$ corresponding to the working electrode B1 coated with the polyurethane coating free of nano-scaled titanium dioxide reaches $10^6$ A/cm$^2$, and the order of magnitude of the self-corrosion current $i_{c2}$ corresponding to the working electrode B3 coated with the polyurethane coating containing 3 wt % surface modified nano-scaled titanium dioxide is $10^{-9}$ A/cm$^2$, 3 orders of magnitudes different from the former. The reduction in the self-corrosion current demonstrates that the polyurethane coating containing the surface modified nano-scaled titanium dioxide has a high protective effect on the A3 Steel electrode under natural light irradiation.

Example 2 is the case shown by ② in FIG. 1, i.e. the steel accepts the electrons generated by exciting the nano-scaled titanium dioxide in the coating layer by light, so that $E_{micro\ cathode}$ of the metal corrosion cell moves negatively, resulting in a reduction of the potential difference ΔE between the cathode and the anode, and further causing decrease of the self-corrosion current, as a result, the steel electrode obtains the corresponding photoelectrochemical protection.

Example 3

3.48 g nano-scaled titanium dioxide particles having a particle diameter of 70-80 nm were precisely weighed, and added in 26.6 ml isopropanol under stirring. After continuous stirring for 20 minutes, 0.21 g diethylene glycol aliphatic acid ester Emcol DO-50 with a hydrophile-lipophile balance value of 4.7 were added therein, and subjected to ultrasonic treatment for 20 minutes. 3.69 g surface modified nano-scaled titanium dioxide was thus obtained by drying for 24 hours at a temperature of 60° C. under reduced pressure. 1 g of said nano-scaled titanium dioxide surface modified by Emcol DO-50, 58 g polyester polyol (100-type, Liaoning Dongchen Polyurethane Co., Ltd) and 13 g diphenyl-methane-diisocyanate were mixed uniformly in 31.6 ml mixed solvent of butanone and xylene (in a volume ratio of 3:1) to obtain a polyurethane coating containing 1 wt % of the surface modified nano-scaled titanium dioxide. 58 g polyester polyol (100-type, Liaoning Dongchen Polyurethane Co., Ltd), and 13 g diphenyl-methane-diisocyanate were mixed uniformly in 32.7 ml mixed solvent of butanone and xylene (in a volume ratio of 3:1) to obtain a polyurethane coating free of nano-scaled titanium dioxide.

A difference of the treated electrode plate, which was prepared as described by Example 1, was replacing copper with Stainless Steel 316 (Beijing Anticorr Corrosion Resistance Technique Development Co., Ltd). The polyurethane coating free of nano-scaled titanium dioxide was coated on the treated Stainless Steel 316 electrode plate, and cured to obtain a working electrode C1. The thickness of the coating layer was measured by using a film thickness gauge as 32 μm. The polyurethane coating containing 1 wt % surface modified nano-scaled titanium dioxide was coated on the other three treated Stainless Steel 316 electrode plates, and cured to obtain working electrodes C2, C3 and C4. The thicknesses of the coating layers were each measured by using a film thickness gauge as 28 μm, 29 μm and 30 μm.

Figure 5:
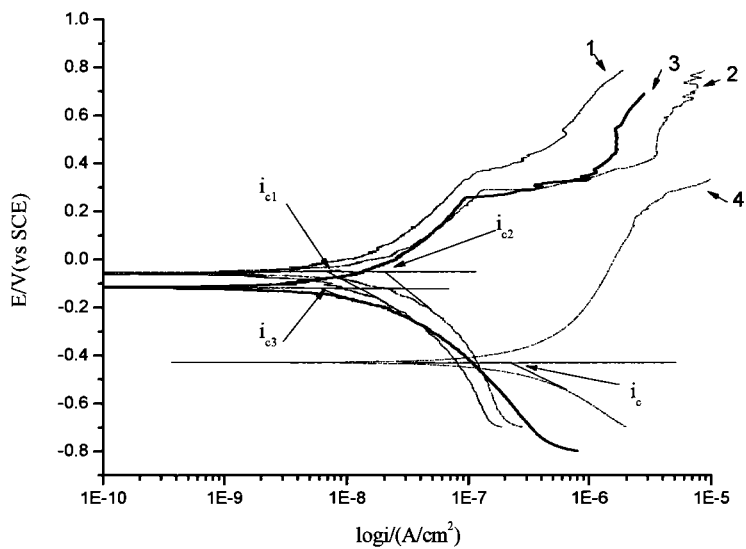
FIG. 5 shows polarization curves of the working electrode of Example 3 coated with a polyurethane coating free of nano-scaled titanium dioxide and immersed in the electrolyte solution for 1 day, and with a polyurethane coating containing 1 wt % surface modified nano-scaled titanium dioxide, and immersed in the electrolyte solution respectively for 1 day, 2 days and 3 days.

The three-electrode systems each comprising the working electrode C1 or C2 were immersed in the electrolyte solution for 1 day, the three-electrode system comprising the working electrode C3 was immersed in the electrolyte solution for 2 days, and the three-electrode system comprising the working electrode C4 was immersed in the electrolyte solution for 3 days. Then, the working electrodes C1, C2, C3 and C4 were measured according to the above mentioned method. The resulting polarization curves are shown in FIG. 5. In FIG. 5, curve 4 is a polarization curve of the working electrode C1, curve 1 is a polarization curve of the working electrode C2, curve 2 is a polarization curve of the working electrode C3, and curve 3 is a polarization curve of the working electrode C4. As shown by FIG. 5, in the case of 1-day immersion, the order of magnitude of the self-corrosion current $i_c$ corresponding to the working electrode C1 coated with the polyurethane coating free of nano-scaled titanium dioxide is $10^{-7}$ A/cm$^2$, and the order of magnitude of the self-corrosion current $i_{c1}$ corresponding to the working electrode C2 coated with the polyurethane coating containing 1 wt % surface modified nano-scaled titanium dioxide is $10^{-9}$ A/cm$^2$, two orders of magnitude different from the former; in the case of 2-day immersion, the order of magnitude of the self-corrosion current $i_{c2}$ corresponding to the working electrode C3 coated with the polyurethane coating containing 1 wt % surface modified nano-scaled titanium dioxide is $10^{-8}$ A/cm$^2$; in the case of 3-day immersion, the order of magnitude of the self-corrosion current $i_{c3}$ corresponding to the working electrode C4 coated with the polyurethane coating containing 1 wt % surface modified nano-scaled titanium dioxide is $10^{-9}$ A/cm², 2 orders of magnitude different from the self-corrosion current $i_c$. The reduction in the self-corrosion current demonstrates that the polyurethane coating containing the surface modified nano-scaled titanium dioxide has a high protective effect on the Stainless Steel 316 electrode.

Example 3 is the case shown by $\hat{3}$ in FIG. 1, i.e. the stainless steel accepts the holes generated by exciting the nano-scaled titanium dioxide in the coating layer by light, so that $E_{micro\ anode}$ of the metal corrosion cell moves positively, resulting in a reduction of the potential difference ΔE between the cathode and the anode, and further causing decrease of the self-corrosion current, as a result, the stainless steel electrode obtains the corresponding photoelectrochemical protection.

Example 4

2.4 g nano-scaled titanium dioxide particles having a particle diameter of 16-20 nm were precisely weighed, and added in 12.1 ml methanol under stirring. After continuous stirring for 20 minutes, 0.07 g sorbitan tristearate Span 65 with a hydrophile-lipophile balance value of 2.1 were added therein, and subjected to ultrasonic treatment for 20 minutes. 2.47 g surface modified nano-scaled titanium dioxide was thus obtained by drying for 24 hours at a temperature of 60° C. under reduced pressure. 60 g polyvinylidene fluoride (T-1 type, Shanghai East Fluorine Chemical Technology Co., Ltd.) was weighed and added into 44.2 ml mixed solvent of butanone and xylene (in a volume ratio of 3:1), uniformly dispersing the polyvinylidene fluoride under stirring in the mixed solvent to obtain a fluorocarbon resin dispersion system. 0.8 g of the nano-scaled titanium dioxide surface modified by Span 65 was added into the fluorocarbon resin dispersion system to obtain the fluorocarbon coating containing 1 wt % surface modified nano-scaled titanium dioxide. 60 g polyvinylidene fluoride (T-1 type, Shanghai East Fluorine Chemical Technology Co., Ltd.) was weighed and added into 45.1 ml mixed solvent of butanone and xylene (in a volume ratio of 3:1), uniformly dispersing the polyvinylidene fluoride under stirring in the mixed solvent to obtain a fluorocarbon coating free of nano-scaled titanium dioxide.

The 1100-type aluminium alloy (Henan Xintai Aluminum Industry Co., Ltd) electrode plate in the size of 2 cm×2 cm was rubbed in sequence by using 200#, 400#, 600# wet sand paper, wiped with alcohol, and then naturally dried in the air. A pencil was used to draw a 1 cm×1 cm marked line thereon, and a hole having a diameter of 3 mm was drilled in a part outside the marked line. The fluorocarbon coating free of nano-scaled titanium dioxide was coated on the surface of the 1 cm×1 cm region inside the marked line, cured in a muffle furnace at 240° C. for 10 minutes, and cooled to room temperature in the air. The thickness of the coating layer was measured by using a film thickness gauge as 35 μm. Aluminium wire was connected to the electrode plate through the hole, and bonded by using 703 Silica Gel (Beijing Chemical Reagent Co., Ltd) to ensure conduction. The part of the electrode plate, which was not coated with the fluorocarbon coating, was encapsulated with 703 Silica Gel, and naturally cured to obtain the working electrode D1. The working electrode D2 was obtained as described hereinabove, except replacing the fluorocarbon coating free of nano-scaled titanium dioxide by the fluorocarbon coating containing 1 wt % surface modified nano-scaled titanium dioxide.

Figure 6:
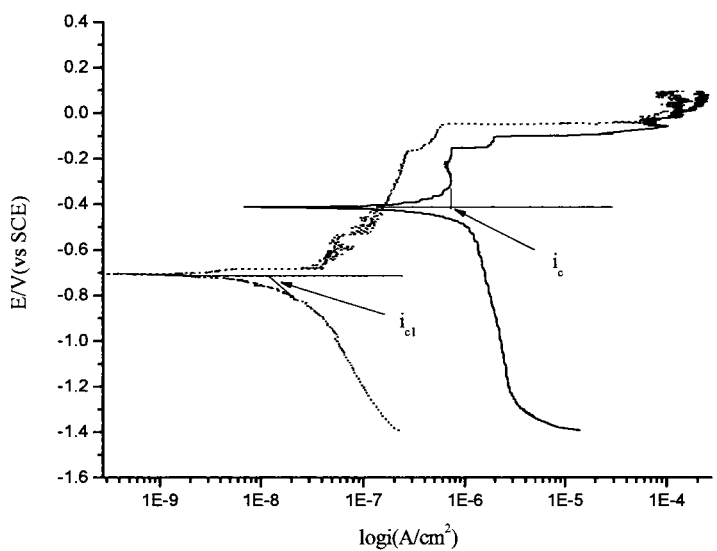
FIG. 6 shows polarization curves of the working electrode of Example 4 coated with a fluorocarbon coating free of nano-scaled titanium dioxide as well as a fluorocarbon coating containing 0.8 wt % surface modified nano-scaled titanium dioxide, which was immersed in the electrolyte solution for 1 day.

The three-electrode systems each comprising the working electrode D1 or D2 were immersed in the electrolyte solution for 1 day, and then the working electrodes D1 and D2 were measured according to the above mentioned method. The resulting polarization curves are shown in FIG. 6. In FIG. 6, the solid curve is the polarization curve of the working electrode D1, and the dotted curve is the polarization curve of the working electrode D2. As shown by FIG. 6, the order of magnitude of the self-corrosion current $i_c$ corresponding to the working electrode D1 coated with the fluorocarbon coating free of nano-scaled titanium dioxide is $10^{-7}$ A/cm², and the order of magnitude of the self-corrosion current $i_{c1}$ corresponding to the working electrode D2 coated with the fluorocarbon coating containing 0.8 wt % surface modified nano-scaled titanium dioxide is $10^{-8}$ A/cm². The reduction in the self-corrosion current demonstrates that the fluorocarbon coating containing the surface modified nano-scaled titanium dioxide has a high protective effect on the 1100-type aluminium alloy electrode.

Example 4 is the case shown by $\hat{2}$ in FIG. 1, i.e. the aluminium alloy accepts the electrons generated by exciting the nano-scaled titanium dioxide in the coating layer by light, so that $E_{micro\ cathode}$ of the metal corrosion cell moves negatively, resulting in a reduction of the potential difference ΔE between the cathode and the anode, and further causing decrease of the self-corrosion current, as a result, the aluminium alloy electrode obtains the corresponding photoelectrochemical protection.

What is claimed is:

1. A photoelectrochemical method for metal preservation comprising applying a coating including the following components on a metal surface and curing the coating:
    A) a film-forming component; and
    B) surface modified nano-scaled titanium dioxide, which consists of nano-scaled titanium dioxide particle as substrate and a nonionic surfactant covered on the nano-scaled titanium dioxide substrate surface; the particle diameter of the nano-scaled titanium dioxide substrate is 1-100 nm; the hydrophile-lipophile balance value of the nonionic surfactant is 1-10; the content of the nonionic surfactant is 1-20 wt % based on the weight of nano-scaled titanium dioxide substrate;
    wherein the content of the surface modified nano-scaled titanium dioxide is 0.1-10 wt % based on the total weight of the coating.

2. The method of claim 1, wherein the nano-scaled titanium dioxide in the cured coating produces electrons and holes under the action of light.

3. The method of claim 1, wherein the cured coating has a thickness of 15-50 μm.

4. The method of claim 1, wherein the film-forming component is a fluorocarbon resin, wherein said fluorocarbon resin is at least one selected from the group consisting of: polyvinyl fluoride, polyvinylidene fluoride, vinylidene fluoride-hexafluoropropylene copolymer, tetrafluoroethylene-hexafluoropropylene-vinylidene fluoride copolymer, tetrafluoroethylene-propylene copolymer and tetrafluoroethylene-vinylidene fluoride-acrylic acid copolymer.

5. The method of claim 4, wherein the nonionic surfactant is at least one selected from the group consisting of: sorbitan tristearate, ethylene glycol aliphatic acid ester, polyoxyethylene sorbitol beeswax, and propylene glycol aliphatic acid ester.

6. The method of claim 1, wherein the film-forming component is polyurethane resin formed by polyol and isocyanate in a weight ratio of 10:1-2:1.

7. The method of claim 6, wherein the polyol is at least one selected from the group consisting of: polyester polyol, polyether polyol, epoxy resin, hydroxyl acrylic resin and hydroxy alkyd resin.

8. The method of claim 6, wherein isocyanate is at least one selected from the group consisting of: toluene diisocyanate, diphenyl-methane-diisocyanate, 1,6-hexamethylene diisocyanate, trimethyl hexamethylene diisocyanate, p-phenylene diisocyanate, 4,4'-dicyclohexylmethane diisocyanate, m-xylene diisocyanate, isophorone diisocyanate, 1,5-naphthalene diisocyanate and isocyanato end capped prepolymers.

9. The method of claim 6, wherein the nonionic surfactant is at least one selected from the group consisting of: ethylene glycol aliphatic acid ester, polyoxyethylene sorbitol beeswax, diethylene glycol aliphatic acid ester, and glyceryl monostearate.

10. The method of claim 1, wherein the metal is at least one selected from the group consisting of: copper, steel, stainless steel and aluminium alloy.

11. The coating as defined in claim 1.

* * * * *